United States Patent [19]

Ekman

[11] Patent Number: 5,159,955
[45] Date of Patent: Nov. 3, 1992

[54] COUPLING PART COMPRISING PRESSURE-REDUCING MEANS

[75] Inventor: Thure Ekman, Skövde, Sweden

[73] Assignee: Dart Engineering AG, Zug, Switzerland

[21] Appl. No.: 642,646

[22] Filed: Jan. 17, 1991

[30] Foreign Application Priority Data

Jan. 17, 1990 [SE] Sweden ................................ 9000163

[51] Int. Cl.⁵ ................................................. F16L 29/00
[52] U.S. Cl. .................................. 137/614.03; 137/614
[58] Field of Search ................ 137/614.04, 614, 614.03

[56] References Cited

U.S. PATENT DOCUMENTS

| | | | |
|---|---|---|---|
| 3,498,324 | 3/1970 | Bruning | 137/614.04 |
| 3,570,543 | 3/1971 | Ekman | 137/614.04 X |
| 4,269,389 | 5/1981 | Ekman . | |
| 4,546,956 | 10/1985 | Moberg . | |
| 4,564,042 | 1/1986 | Ekman . | |
| 4,896,697 | 1/1990 | Stromdahl | 137/614.03 |

FOREIGN PATENT DOCUMENTS

| | | |
|---|---|---|
| 491000 | 2/1976 | U.S.S.R. .......................... 137/614.04 |
| 1159688 | 7/1969 | United Kingdom . |
| 1495395 | 12/1977 | United Kingdom . |
| 2196080 | 4/1988 | United Kingdom . |

Primary Examiner—John C. Fox
Attorney, Agent, or Firm—Pollock, Vande Sande & Priddy

[57] ABSTRACT

A coupling part constituting the male or female part in a quick coupling comprises an inner, longitudinally displaceable unit positioned in an outer part of the coupling part the inner unit being adapted in a deactivated position thereof to confine the media pressure in a first chamber arranged in the outer part of the coupling part and in an actuated position to open or keep open an access for media to a second chamber in the outer part. Pressure-reducing members actuable upon coupling together of the male and female parts and allowing for the coupling even at high media pressures, and including a lead-off channel for media pressure and a shut-off element positioned in the channel, and actuable by the end face of the other coupling part through an actuation member. The actuation member is sealed-off or positioned in the coupling part in order to prevent lead-off media from reaching the end face of the coupling part. The lead-off channel on both side of the shut-off element is connectable to the first and the second chambers and upon actuation of the pressure-reducing member, the first and second chambers communicate through lateral connections in the inner unit the lead-off channel and the opened shut-off element whereby accompanying decompression of the pressure in the first chamber facilitates the longitudinal displacement of the inner unit, as a result of which it is possible to obtain leakage-free connection of the coupling parts in the presence of any media pressure.

17 Claims, 4 Drawing Sheets

COUPLING PART COMPRISING PRESSURE-REDUCING MEANS

FIELD OF THE INVENTION

The present invention relates to a coupling part constituting the male or female part in a quick coupling. It comprises pressure-reducing means actuable upon coupling together of the male and female parts in order to permit coupling even at high media pressures, for example 20–50 MPa, in the coupling part. The latter comprises an inner, longitudinally displaceable unit which in a starting position keeps the media pressure confined in a first chamber in the coupling part and in an actuation position opens or keeps open for media so that the media gains access to a second chamber in the coupling part. The pressure-reducing means comprises a lead-off channel for media pressure and a shut-off element which is arranged in the channel, and can be actuated at the end face of the coupling part via an actuation member which can cooperate with the shut-off element.

BACKGROUND ART

It is already known to use pressure-reducing means in the coupling part of a quick coupling. By means of the pressure-reducing means it is possible to reduce pressure in the coupling part by leading off a small amount of media (for example hydraulic oil, other liquid, gas etc.) to the end face of the coupling part. The coupling together of the coupling parts of the quick coupling is facilitated in this way. It is also known to arrange pressure-reducing means in both coupling parts.

It is also known to use pressure-reducing means in a coupling part which operates with a double shut-off for the media pressure, in which a first shut-off function first shuts off the pressure in a first uncoupling stage of the coupling parts, and a second shut-off function, which complements the first shut-off function, is established in the final stage of the uncoupling procedure.

In the case of coupling arrangements of the type in question, there is desirable to use the same coupling part construction regardless of the situation in which it is employed. Sometimes coupling is to be carried out with pressure in the female part and sometimes with pressure in the male part. Coupling together may also be carried out with pressure in both coupling parts and with a pressureless condition in both coupling parts.

A further requirement is that the coupling and uncoupling should be carried out in a manner completely free from spillage or leakage. The basic problem is therefore to be able to couple up/disconnect pressures, even high pressures, in a leakage-free manner in different situations and with different system constructions in which one and the same quick-coupling type is to be used.

For this purpose, a pressure-reducing concept is required, which has an all-round application and which can be used according to the modular concept in the quick-coupling part construction. One or both coupling parts are to be provided with the pressure-reducing means so that coupling constructions which are tailor-made for different application situations can be obtained.

In this context it is crucial that the pressure-reducing means can operate with a technical principle otherwise uncritical for the pressure-reducing function and the quick-coupling function. The pressure-reducing means will consist of parts which can be easily assembled and which can be applied easily in the coupling part in question, so that the coupling part does not need to have an essentially different construction compared to a coupling part without pressure-reducing means.

It is important that there should be complete freedom from leakage, which means, among other thing, that the media which has been led off cannot be allowed to reach the end face of the coupling part.

SUMMARY OF THE INVENTION

The aim of the present invention is to provide an arrangement which solves, among other thing, the problems mentioned hereinabove. The feature which may principally be regarded as characterising the new arrangement is that the actuation member is designed sealed-off in order to prevent lead-off media from reaching the end face, that the pressure-reducing channel on both sides of the sealing element is connected or can be connected to the first and second chambers mentioned at the outset, and that, upon actuation of the pressure-reducing member, the first and second chambers form two communicating vessels/chambers via the connections to the channel and the opened shut-off element with accompanying decompression of the pressure in the first chamber and facilitating of the longitudinal displacement of the longitudinally displaceable unit, as a result of which it is possible to obtain leakage-free connection in the presence of any media pressure.

Further developments of the inventive concept concern the construction of the pressure-reducing means and its positioning in the respective coupling part. Thus, the actuation member included in the pressure-reducing member can be designed to extend from the end face of the unit inwards into the channel where it is mounted longitudinally displaceable in a first channel part so that a first section of the actuation member can project from the end face in order to be acted upon by the second coupling part, which can cooperate with the coupling part in question, in the quick coupling during coupling together of the coupling parts.

In one embodiment a sealing member cooperates with the actuation member, which sealing member can seal off the first section of the actuation member. The pressure-reducing means can be formed by means of a bushing unit which comprises the pressure-reducing channel. The pressure-reducing channel can comprise a second channel part which is designed to define the longitudinal displacement movements of the actuation member in the first coupling part/unit with the aid of a flange member arranged on the actuation member. The bushing unit can moreover be arranged with one or more lateral recesses which can be positioned opposite corresponding recesses in the coupling part/unit in order to form one or more connections between the channel and the second chamber in the coupling part when the coupling parts of the quick coupling assume a coupling position in which the pressure-reducing member can be actuated. The sealing member is preferably annular and arranged in an annular chamber together with a so-called back-up seal. In one embodiment the bushing unit has step-shaped internal recesses for that first section of the actuation member which can extend beyond the end face, for the sealing member and the bearing part of the actuation member.

In one embodiment the bushing unit lies against or in another embodiment comprises a seat-supporting part. The seat can cooperate with a spherical body or ball included in or forming the shut-off element. The body or ball is acted upon at first side by the actuation member via a second section of the latter. The second section extends through the seat-supporting part. At its other side, the body or ball is acted upon by a spring force arranged in a third channel part situated behind the shut-off element. One or more other connections in the coupling part/unit are designed to extend from the third channel part to the first chamber in the position of the coupling parts in which the pressure-reducing means is actuated.

In one embodiment the pressure-reducing means is used on a coupling part which comprises a unit having two telescopically arranged components which are mutually longitudinally displaceable. The first component effects the starting position and actuation position of the unit with the aid of a spring function and a possible pressure. The second component effects a sealing, opening and closing function at the end of the coupling part/unit and comprises the pressure-reducing means.

In one embodiment the second connection between the pressure-reducing channel and the first chamber leads via recesses, which can be positioned opposite each other, in the first and second components. The components are positioned opposite each other in such a way that the second component assumes a position in which it is fully connected together with or inserted in the first component.

The invention is also concerned with the function and construction of the pressure-reducing means in relation to the procedure for uncoupling the coupling parts of the quick coupling.

By means of the invention it is possible to provide the coupling part with pressure-reducing means in a simple manner and to select the quick-coupling part and its function depending on the requirements as determined by the application and the environment in which the quick coupling is to be used. The invention is suitable for series production and gives very good results as regards freedom from leakage and the possibility of obtaining different quick-coupling constructions which are optimized for the application in question. The quick coupling can be made up of technically functional and reliably operating parts with a long service life. Coupling is also possible at high pressures.

A presently proposed embodiment of an apparatus showing the characteristic features pertaining to the invention will be described hereinbelow with reference to the attached drawing, in which

DETAILED DESCRIPTION OF THE PREFERRED EMBODIMENT

Figure 1:
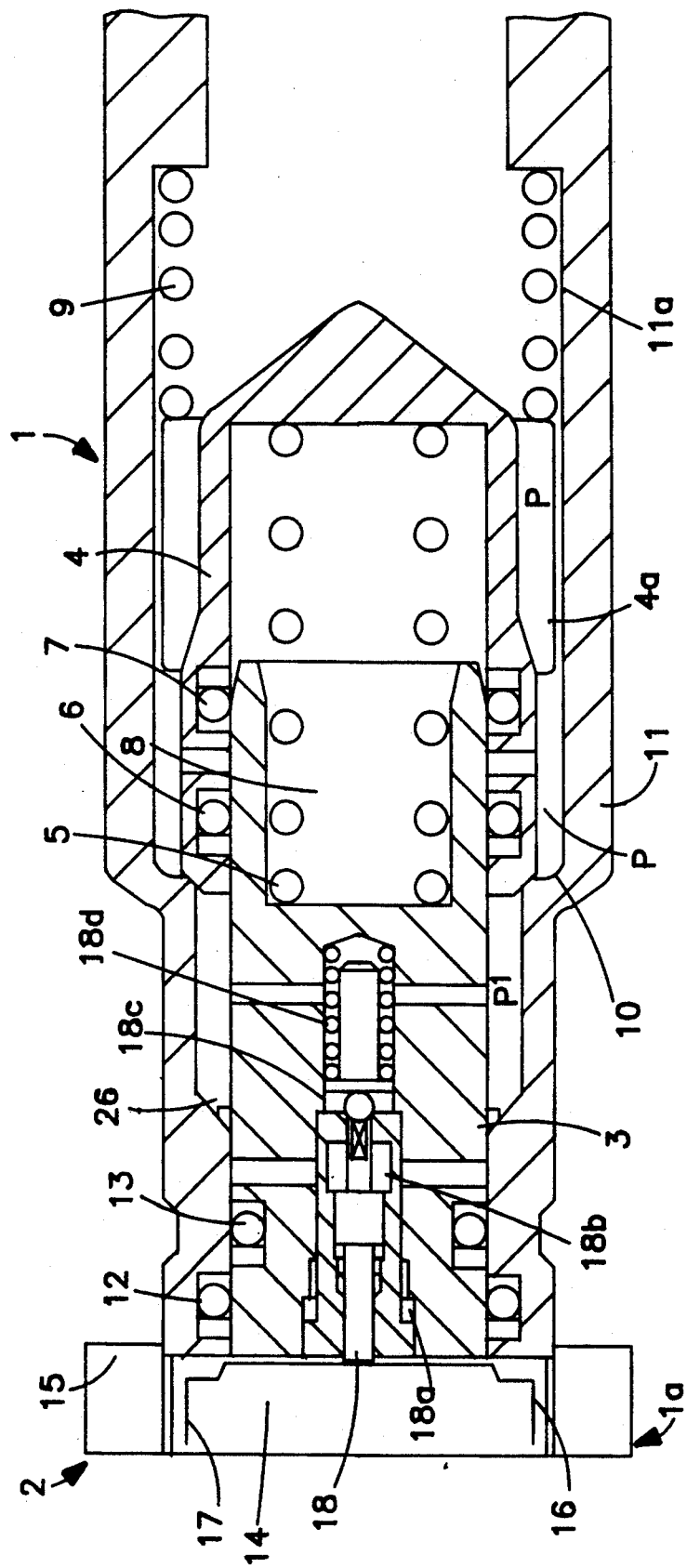
FIG. 1 shows, in longitudinal section, those parts, essential to the invention, of the male and female coupling parts in a quick coupling in which the male and female parts assume a first position relative to each other during the procedure for coupling together of the coupling parts.

In the figures a male coupling part and a female coupling part in a coupling construction are indicated by 1 and 2 respectively. The male coupling part is of the type which has an inner, longitudinally displaceable unit which is made up of a first component 3 and a second component 4. The components 3 and 4 are telescopically arranged in relation to each other and are pushed together counter to the action of an internal spring. In this embodiment the latter can be effected by means of a mechanical spring 5. The component 3 can be pushed into the component 4, and they are mutually sealed off by sealing members 6 and 7 (sealing ring and back-up seal). The components 3 and 4 form an inner sealed chamber 8 in which the spring 5 is arranged. The pressure in the chamber may correspond to the atmospheric pressure in the expanded position of the components 3 and 4.

The unit (components 3 and 4) is arranged longitudinally displaceable counter to the action of a spring function, effected, for example by a mechanical spring 9. The unit (3,4) is displaceable counter to the action of the spring 9 by means of the coupling force which is effected upon coupling together of the coupling parts 1 and 2. FIG. 3 shows the fully coupled position of the coupling parts 1 and 2, in which the spring 9 is compressed. Upon separation of the coupling parts 1 and 2, the inner unit (3,4) is returned to the position according to FIGS. 1 and 2. FIG. 1 shows the position in which the components 3 and 4 are fully expanded in relation to each other. In this position there is a double sealing function or double shut-off function in the coupling. The first shut-off or sealing function is effected by the second unit 4, is indicated by 10 and in this embodiment consists of a metal-on-metal seal. The second shut-off function or sealing function is effected by the component 3 which, at the end 1a of the male part, bears sealingly against the inner surface on the front part of the outer part 11 of the male part. Sealing members 12, 13 effect this sealing function. The inner unit (components 3,4) is guided on an inner surface 11a of outer part 11 via wing or spoke-shaped elements 4a. In the embodiment shown, the component 4 has the shape of a cap which encloses the rear section of the component 3.

Figure 2:
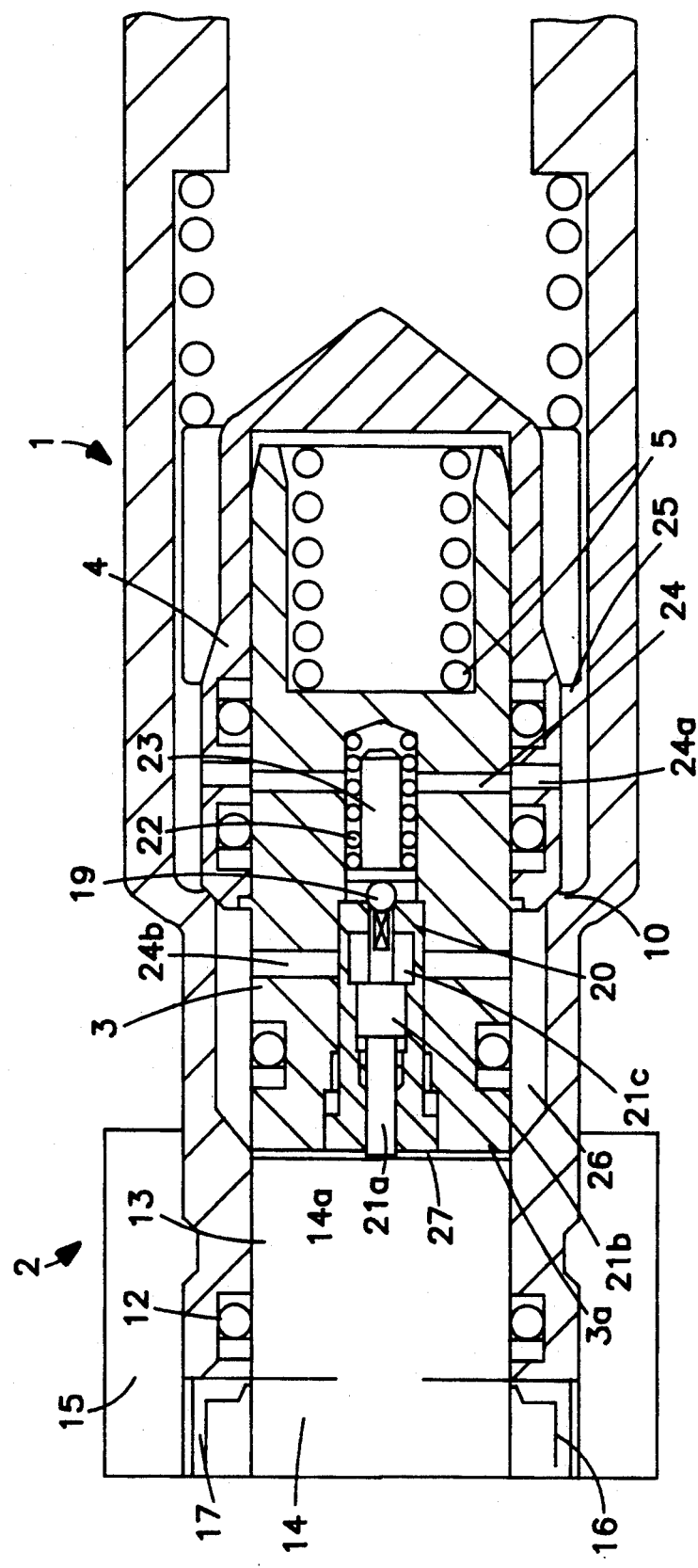
FIG. 2 shows, in longitudinal section, the coupling parts according to FIG. 1 in a second position during the coupling procedure.
Figure 3:
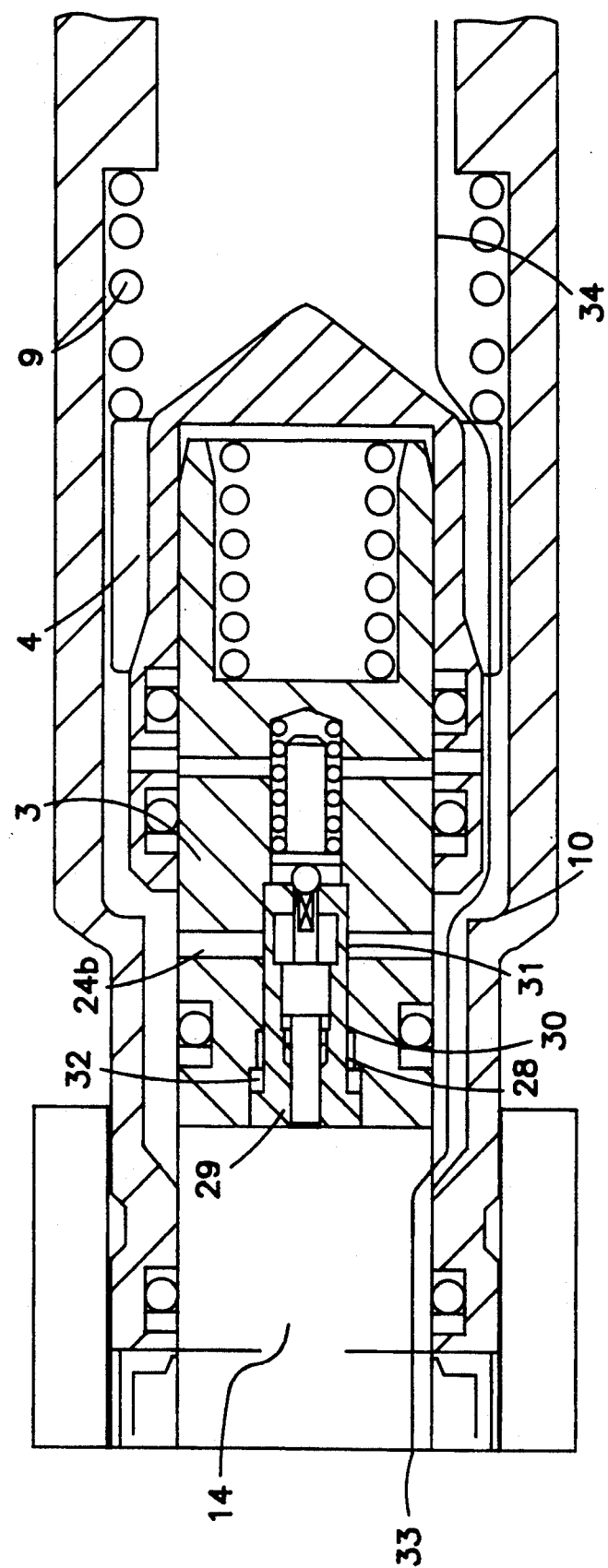
FIG. 3 shows, in a longitudinal section, the parts according to FIGS. 1 and 2 in a third position during the coupling procedure, which third position constitutes the coupling position of the parts.

FIG. 2 shows the coupling stage between parts 1 and 2 in which the shut-off or sealing function effected by component 3 has been deactivated and in which the shut-off function or sealing function 10 is still activated. In this position the component 3 is maximally inserted into the component 4. In FIG. 3 the shut-off or sealing function 10 has also been deactivated, and the components 3 and 4 in their fully interconnected positions have together been moved rearwards to the fully opened position for the coupling as such.

The actuation force for the components 3 and 4 is conveyed via a part 14 in the female part. The part 14 is longitudinally displaceable relative to the outer part 15 of the female part. The female part also comprises inner sleeves 16 and 17 which are longitudinally displaceable relative to the outer part 15 on the one hand and the part 14 on the other hand. The relative displacement movements ensure that there is reliable sealing between the coupling parts 1 and 2 before the inner passage of the coupling parts is opened for coupled media and, similarly, that there is sealing between parts 1 and 2 until the passage for the coupled media is closed in conjunction with the uncoupling of the parts 1 and 2. These functions are known and the present invention does not concern these.

The male part is provided with pressure-reducing means which is arranged in the inner unit (3,4). In the preferred embodiment, the pressure-reducing means is arranged in the component 3. The pressure-reducing means comprise a channel which leads off the pressure media and which comprises channel parts 18a, 18b, 18c and 18d. The channel extends from the end face 1a or 3a of the coupling part or components 3, respectively, inwards into the coupling part or component 3, respectively. The pressure-reducing means also comprise a shut-off element 19 in the form of a spherical body, ball, and the like which cooperates with a seat part 20. On its first side the element 19 can cooperate with or is connected to an actuation member which has a first section 21a, a bearing member 21b and a second section 21c, which extends through the seat part 20 and via which the cooperation with or connection to the element 19 is achieved.

The actuation member is longitudinally displaceable in the channel. The first section 21a of the actuation member extends inside the channel part 18 in such a way that its end can project out beyond the end face 3a. The bearing member (which can consist of a flange member) 21b is mounted in the channel part 18b which defines the longitudinal displacement movement of the actuation member. By means of the insertion of the actuation member in the channel during the coupling together of coupling parts 1 and 2, the actuation member can be made to act on the element 19 from the seat so that the channel is opened. When the actuation by the actuation member ceases, the channel is closed by means of the element 19 being pressed against the seat by the spring 19 and any pressure in the channel part 18c.

On its other side, the channel is acted upon by a spring. In the preferred embodiment, this is provided by means of a spring 22 which exerts a force on the element 19 via a force-transmitting member 23 of known type. The channel part 18c can be connected, via one or more recesses (for examples holes) 24 and 24a in components 3 and 4 respectively, to a first chamber 25 outside the inner unit (3,4). The channel part 18b can be connected, via one or more recesses (for example holes) 24b in the component 3, to a second chamber 26 outside the unit (3,4).

The chambers 25 and 26 are shown in FIG. 2 in which chamber 25 is situated behind the seal 10 and chamber 26 is situated in front of the seal 10. The connection between the channel 18, 18a, 18b and 18c is established only in a position in which the components are pushed fully together. In the positions of the coupling parts 1 and 2 as shown in FIG. 2, the connections 24, 24a and 24b open out on both sides of the shut-off or seal 10.

As is shown in FIGS. 1 and 2, there is a gap 27 between the end faces 3a and 14a of parts 3 and 14 in the male and female parts, respectively. This gap is due to the fact that the force transmitted from the part 14 to the actuation member 21a, 21b, 21c has not yet attained the magnitude which allows the actuation member to overcome the force of the spring 22 and any pressure on the element 19 which is present in the channel part 18c on account of its connection to the chamber 25. However, the force actuation, continued from the position shown in FIG. 2, from the component 14 to the part 3 means that the resistance force of the element 19 can be overcome and the element 19 can be lifted from the seat part 20. This allows a connection to be established between the chambers 25 and 26 functioning in this respect as communicating vessels or chambers. The connection is established between the recesses 24, 24a and 24b and the element 19. Any pressure existing in the chamber 25 can thus be let out by means of a slight lead-off of media from 25 to chamber 26.

The actuation member is sealed off so that the lead-off media in the channel does not reach the end face 3a. The sealing is achieved by means of a sealing member 28 (which can consist of an annular seal and a back-up seal) which is arranged in channel part 18a and seals off the first section 21a of the actuation member. The second section 21c of the actuation member is reduced in cross-section or is provided with longitudinal grooves in order to facilitate the leading-off via the actuation member. The leading-off thus takes place, in accordance with what is stated above, from a first chamber to a second chamber within the same coupling part.

The channel 18, 18a, 18b and 18c is arranged in a bushing unit 29 which is securely pressed or securely screwed into a thread 13 in a corresponding recess or internal thread in component 3. The bushing unit is provided with lateral recesses 31 which may be positioned opposite the connections 24b in the unit. The bushing unit is pressed against the seat part 20 which, in an alternative embodiment, can constitute part of the bushing unit. The bushing unit is sealed off with respect to the shell of the component 3 via a seal 32. The male part is connected in a known manner to a tube or conduit which in turn can be connected to a user, pressure source and the like. In the position in which it is uncoupled from the female part, a pressure P can remain in the chamber 25. This pressure thus exceeds a pressure P' in the chamber 26. Pressure equalization in the chambers is thus achieved by means of the pressure-reducing means in accordance with the above. In the opened position of the male and female parts, a passage is established for media (liquid, gas, and the like). Depending on the situation in which the quick coupling is used, the direction of flow can be in either direction 33 or 34. Upon uncoupling of the parts, the first shut-off function is first established by means of the component 4 and the shut-off function 10. Thereafter, the components 3 and 4 can be mutually expanded and the second shut-off function by means of the seals 12, 13 is established. The pressure in chamber 8 is preferably chosen in such a way that it is well below the media pressure in the media passage channel 33 or 34 and/or the pressure P.

The production of a component 3 with pressure-reducing members is advantageous. The component 3 is provided with bore holes for the channel part 18c and the bushing unit 29. Part of a bore hole for the bushing unit is threaded.

The unit is provided with lateral recesses 24, 24b. The bushing unit 29 is produced as a separate unit, which is provided with a screw thread 28 and lateral holes 31. The application of the pressure-reducing means is in this way straightforward. The spring 22 is first applied in its recess 18c. Thereafter, the member 23, the element 19, the seat 20 and the bushing unit with associated actuation member and seal 32 are applied. The seal, which upon changing fits a hole, is made at least partially of mechanically strong material. A so-called back-up seal may be used.

The invention is not limited to the embodiments shown hereinabove by way of example, but instead can be subject to modifications within the scope of the following patent claims and within the inventive concept.

In FIGS. 4a–4d the longitudinally displaceable unit is indicated by 3', the first chamber by 25' and the second chamber by 26'. The chamber 26' forms a wholly enclosed chamber, for example a chamber enclosed in coupling part 1'. The media pressure channel has the reference 18a', 18c' and the shut-off element 19'. The actuation member is formed by 21a' and a bearing member/housing 35 and a valve member 36. The member 35 is longitudinally displaceable relative to the outer sleeve 37 of the coupling part 1' on wing-shaped elements 38 which can be three or more in number. The valve member 36 is displaceable in the member 35, in a chamber 39 in the latter, counter to the action of a spring member 40. The unit 3' is displaceably arranged relative to the sleeve 37. The unit 3' is mounted in a bearing part/further bearing housing 40' which is fixed inside to the coupling part 1' via two or more wing-shaped elements 41. The longitudinal displacement of the unit 3' is effected counter to the action of an internal spring member 42. The unit 3' is pressed against a seat 43 of the spring member 42 and preferably supports a sealing member 44 for effective sealing with respect to the seat. The first and second chambers form two communicable vessels which can be connected via connections 24', 24b' upon opening of the shut-off element. A part 45 supporting the seat 43 is screwed into the end of the sleeve 37 in threads 46 and is sealed off by sealing member 47. The valve member 36 is sealed off in the bearing housing by sealing member 48. The valve member 36 is held in its shut-off position (according to FIG. 4a) by the spring 40 and with the aid of stop member (flange) 49. The sleeve 37 has at the front an internal bearing-/sealing surface 50 which can cooperate with an external sealing surface 51 on the 36. At the sealing surface, sealing members 52, 53 are arranged in the sleeve 37 and/or in the member 36. The member has a design which allows it to be inserted into the housing 35 without compression of any media in chamber 26' taking place. The member 36 is designed with essentially the same external outer dimension/diameter on its section projecting outside the housing 35, and the member 36 preferably constitutes a part designed with the same diameter along its entire length and with an inner recess extending along substantial parts of the length.

The coupling part 1' can be opened by a comparatively small opening force (manual force) F even if a high pressure, P1 for example 20–50 MPa is present in the chamber 25' of the coupling part 1' (or the conduit connection to the chamber). Opening can also be carried out when a comparatively high pressure P2 is present in the second chamber 26'. The pressure in the chamber 39 is substantially lower, for example equal to atmospheric pressure, than the value which P2 assumes or can assume. P2 is below P1 and can assume values of, for example, 10 to 20% of P1. The valve member can therefore always be easily displaced in the bearing housing 35. The unit 3' always closes with any high pressure existing in the first chamber 25'. The coupling part 1' therefore operates with a double shut-off of the pressure, which permits opening at low opening forces and which is spillage-free.

The second coupling part, for example a female part 2; comprises a fixed central body 54, a longitudinally displaceable inner sleeve 55 which can cooperate with the latter, and a longitudinally displaceable protective sleeve 56 arranged outside the inner sleeve. The sleeves 55 and 56 can be displaced mutually and relative to the body 54 counter to the action of springs 57, 58. The part 1' is also provided with outer locking members 58 (locking sleeve(s), locking balls, and the like). The inner sleeve is mounted in an internally secured rear inner sleeve 59, and the body 54 is at the rear securely mounted in bearing member 60, bearing wings, and the like which have passages 61 for coupling media. The sealing surfaces of the body 54 and of the sleeve 55 are preferably conical. The sleeve 55 has a stop surface 64 which defines the maximum insertion position of the sleeve 55 and a stop surface 65 which defines the maximum insertion position of the sleeve 56 relative to the sleeve 55 and the sleeve body 1'. The member 60 is secured in the body 54, for example by threads 66, and is sealed off by sealing member 67 with respect to the sleeve body 2".

The sleeve 59 is mounted on or against the member 60 and has a bearing surface for the spring 57. The seal 67 seals the gap between the member 60 and the sleeve 59. The sleeves 55 and 59 are sealed off by sealing member 68. The sleeve 55 has a bearing surface for the spring 58. The sleeve 55 is designed with an elongate section 55a extending in the longitudinal direction of the sleeve.

Figure 4A:
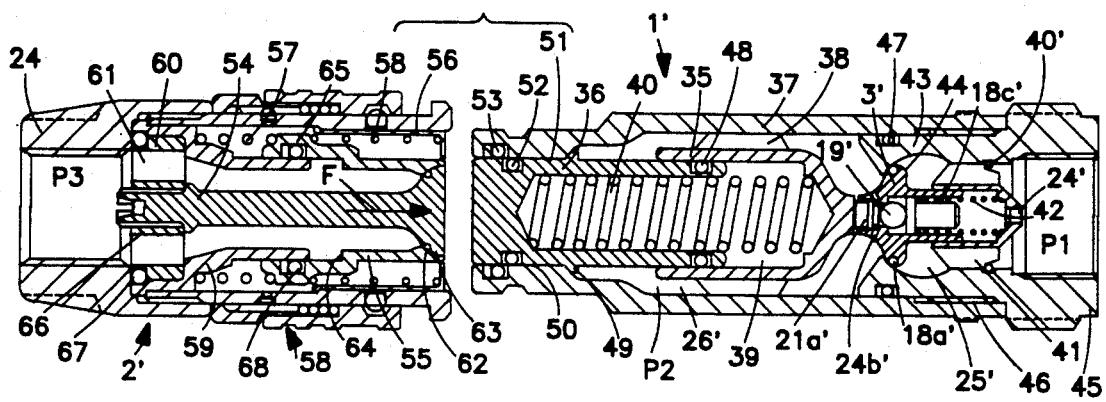
FIGS. 4a–4d show, in longitudinal section, a detailed embodiment in different stages of coupling.
Figure 4B:
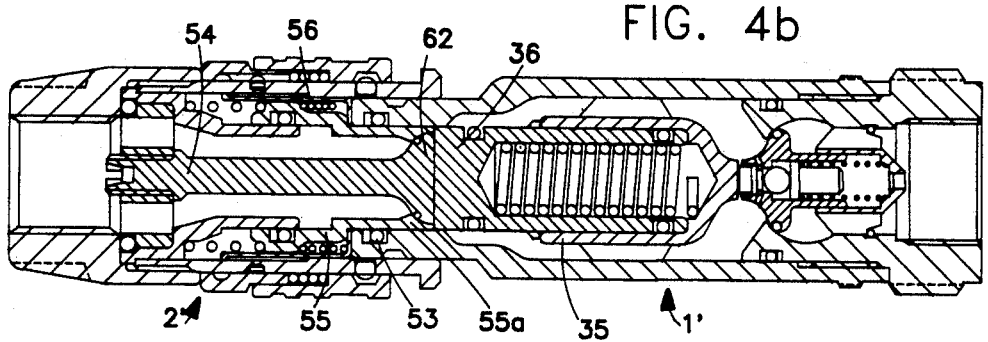

When joining or coupling the parts 1' and 2" together, first the protective sleeve 56 is displaced longitudinally relative to the inner sleeve 55 and the member 36 relative to the member 35 (which, in the coupling stage, is allocated its longitudinal displacement position by the spring 42), in accordance with FIG. 4b. The sealing member 53 seals off the section 55a. The inner sleeve 55 still bears sealingly against the part 62 of the central body 54.

During this stage of the coupling, no leakage to the outside can occur because the member 36 and the surface 50 have protruding extensions in the longitudinal direction and due to the presence of the double seals 52, 53. The pressure P2 can be comparatively high.

Figure 4C:
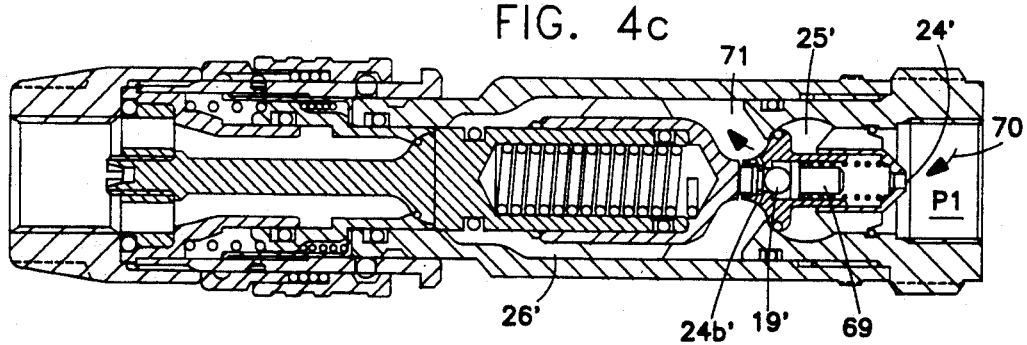
Figure 4D:
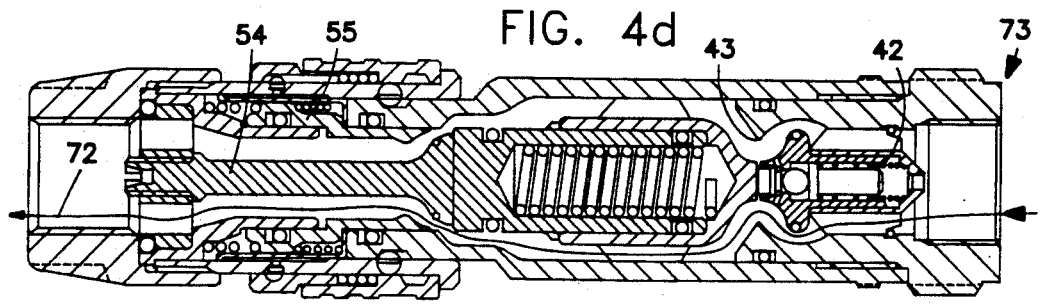

When coupling together is continued to the position shown in FIG. 4c, the shut-off element 19, is actuated. The continued high pressure P1 in the chamber 25' is let out by means of a pilot flow being established via the connection 24', the opened shut-off element 19' and the connection 24b'. In the embodiment shown, use is made of a pressure pin 69 via which the spring 42 seeks to hold the shut-off element (ball) 19' closed. The pressure pin is provided with a head part/section which bears against the element 19' via preferably a single-point bearing. The head part is guided against an inner wall in a recess in the unit 3'. The head section of the pressure pin is provided with side passages (not shown specifically) for the pilot flow, which thus can pass from the chamber 25, to the chamber 26'. An arrangement with such a pressure pin is already known, for example from U.S. Pat. No. 4,564,042. The pilot flow is indicated by arrows 70, 71. After this actuation of the pressure-reducing function in the unit 3', the unit 3' can move from its seat 43 as shown in FIG. 4d. The movement is effected counter to the action of the springs 42. During the last-mentioned part of the joining movement, the inner sleeve is also displaced relative to the body 54. A media passage for a main flow has thus been established through the coupling 1', 2" despite high pressures in the coupling part 1. It has also been possible to establish this in a spillage-free manner. The uncoupling of the parts 1' and 2" is carried out in the reverse manner, that is to say the high pressure on the input side 73 is first shut off by the unit 3', after which the sealing sleeve 55 and the valve member 36 are shut in reverse sequence with simultaneous reliable sealing, in order to permit leakage-free uncoupling. In the case in question, there is a pressure P3 in coupling part 2' of zero (0). The coupling part itself can be used in other situations.

I claim:

1. In a coupling apparatus for quick coupling including a first and a second coupling part adapted to be coupled together, said first coupling part comprising:

an outer, tubular part, said outer part defining a first and a second chamber positioned in the longitudinal direction of said outer part adjacent to a front portion extending a distance from a face surface of said outer part;

an inner longitudinally displaceable unit positioned inside said outer part and movable between a deactivated starting position and a fully activated position in which said first and second coupling part are fully coupled, said inner longitudinally displaceable part being activated into said activated position by said second coupling part; said inner displaceable unit having pressure reducing means including a lead-off channel means for media pressure, a shut off element positioned in said channel means and an actuation member for actuation of said shut-off element, said lead-off channel means being connectable on each side of said shut-off element to said first and second chamber;

first sealing means being provided on said inner unit for ensuring sealing between said first and second chamber, said first sealing means including said shut-off element; and second sealing means for sealing said actuation member in said lead-off channel to prevent leakage of media to said end face of said inner unit and said first coupling part;

wherein in said deactivated position of said inner unit said first sealing means is adapted to confine said media pressure in said first chamber and in said activated position of said inner unit said shut-off element is adapted to open and said channel means connected on each side of said shut-off element allowing for releasing media pressure from said first chamber into said second chamber facilitating coupling of said first and second coupling parts even at high pressure.

2. A coupling part according to claim 1, wherein both the male part and female part comprise pressure-reducing members.

3. A coupling part according to claim 1, wherein said inner longitudinally displaceable unit is displaceable counter to the action of a spring which returns said inner unit to its deactivated position upon uncoupling of the male and female parts, and wherein, when the inner unit assumes its deactivated, starting position, the media connection to the pressure-reducing channel is broken.

4. A coupling part according to claim 1, wherein said connection between the lead-off and the first chamber leads through recesses, which can be positioned opposite each other, in the first and second components of said inner unit, and wherein said first and second components are positioned opposite each other when said second component assumes the fully connected position with respect to said first component.

5. A coupling part according to claim 1, wherein said lead-off channel means is connected on each side of said shut-off element to said first and second chambers.

6. A coupling part constituting the male or female part in a quick coupling and compressing:

an inner, longitudinally displaceable unit positioned in an outer part of said coupling part, said inner unit being adapted in a starting, deactivated position thereof to confine the media pressure in a first chamber arranged in said outer part of the coupling part and in an actuated position said inner unit being adapted to open or keep open an access for media to a second chamber in said outer part of the coupling part;

pressure-reducing means actuable upon coupling together of the male and female parts and allowing for said coupling together even at high media pressures, said pressure-reducing means comprising a lead-off channel for media pressure and a shut-off element positioned in said channel, said shut-off element being actuable by the end face of the other coupling part in said coupling through an actuation member which also constitutes a part of said pressure-reducing means, said actuation member being designed sealed-off or positioned in said coupling part in order to prevent lead-off media from reaching the end face of the coupling part;

wherein said lead-off channel on both sides of said shut-off element is connectable to said first and said second chambers and wherein, upon actuation of the pressure-reducing means, said first and said second chambers form two communicating chambers through lateral connections in said inner unit, said lead-off channel and the opened shut-off element wherein accompanying decompression of the pressure in said first chamber facilitates the longitudinal displacement of the inner unit, as a result of which it is possible to obtain leakage-free connection of the coupling parts in the presence of any media pressure.

7. A coupling part according to claim 5, wherein said actuation member is extendable from the end face of the coupling part of inner unit inwardly into said channel and is longitudinally displaceable in a first channel part, said actuation member having a first section extendable from the end face in order to be acted upon by said other coupling part during coupling together of the coupling parts of the quick coupling, and wherein at least one sealing member is arranged to seal off said first section of the actuation member with respect to said channel of said inner unit so that the lead-off media in the channel is prevented from reaching the end face.

8. A coupling part according to claim 5, wherein said channel is located in a bushing unit which is positioned in a recess in said inner unit, said busing unit comprising a second channel part which is designed to allow for the longitudinal displacement movements of the actuation member with a flange member provided thereon, and wherein said busing unit has at least one lateral recess which can be aligned with corresponding recess in said inner unit in order to form at least one connection between the channel means and the second chamber in the coupling part when the coupling parts of the quick coupling assume a coupling position in which said pressure-reducing means can be activated, said connection being situated at the side of said shut-off element closer to said and face.

9. A coupling part according to claim 8, wherein at least one sealing member is situated at the side of the second channel part closer to said end face, in an annular chamber allocated to the sealing member, said sealing member comprising an annular seal and a packing seal and wherein said busing unit has step-shaped internal recesses for that section of the actuation member which is extendable outside the end face, for the sealing member.

10. A coupling part according to claim 8, wherein said bushing unit bears against or comprises a seat-supporting part whose seat cooperates with a spherical body forming part of said shut-off element, which, at its first side, can be acted upon by the a second section of said actuation member which second section extends through the seat-supporting part, and at its other side can be acted upon by a spring member arranged in a third channel part situated behind the shut-off element, and wherein at least one second connection in the inner unit is provided to the second chamber when the pressure-reducing means is actuated.

11. A coupling part according to claim 5, wherein said inner longitudinally displaceable unit comprises two telescopically arranged components which can be longitudinally displaceable relative to each other, wherein a first longitudinally displaceable component maintains the starting position and actuation position of the inner unit through a spring force acting thereupon and a possible media pressure, and wherein a second component effects a sealing, opening and shutting function at the end of the coupling part and comprises said pressure-reducing means.

12. A coupling part according to claim 11, wherein, during the coupling together of the male and female coupling parts, said first component of said inner unit first assumes its starting position in which the first and second chamber are separated by means of said first sealing means effected by said first component of said inner unit, such that the high media pressure is present in said first chamber and wherein said connection between the first and second chambers is established through said lead-off channel means, opened shut-off element and said first and second connections from said chambers, through said inner unit to said lead-off channel on both sides of the shut-off element, when the male and female parts, after continued coupling together, reach a position in which said second component is fully inserted in said first component of said inner unit and the pressure-reducing means is actuated.

13. A coupling part according to claim 11, wherein said inner longitudinally displaceable unit comprises two telescopically arranged components which can be longitudinally displaceable relative to each other, wherein a first longitudinally displaceable component maintains the starting position and actuation position of the inner unit through a spring force and a possible media pressure, and wherein a second component effects a sealing, opening and shutting function at the end of the coupling part and comprises said pressure-reducing means.

14. A coupling part according to claim 5, wherein said connection between said lead-off channel and said first chamber leads through recesses, which can be positioned opposite each other, in the first and second components of said inner unit, and wherein said first and second components are positioned opposite each other when said second component assumes the fully connected position with respect to said first component.

15. A coupling part according to claim 5, wherein both the male part and female part comprise pressure-reducing members.

16. A coupling part according to claim 5, wherein said inner longitudinally displaceable unit is displaceable counter to the action of a spring which returns said inner unit to its deactivated position upon uncoupling of the male and female parts, and wherein, when the inner unit assumes its deactivated, starting position, the media connection to the pressure-reducing channel is broken.

17. A coupling part according to claim 6, wherein said lead-off channel is connected to said first and second chambers.

* * * * *